T. TULLY.
Apparatus for the Manufacture of Illuminating Gas.
No. 197,001. Patented Nov. 13, 1877.
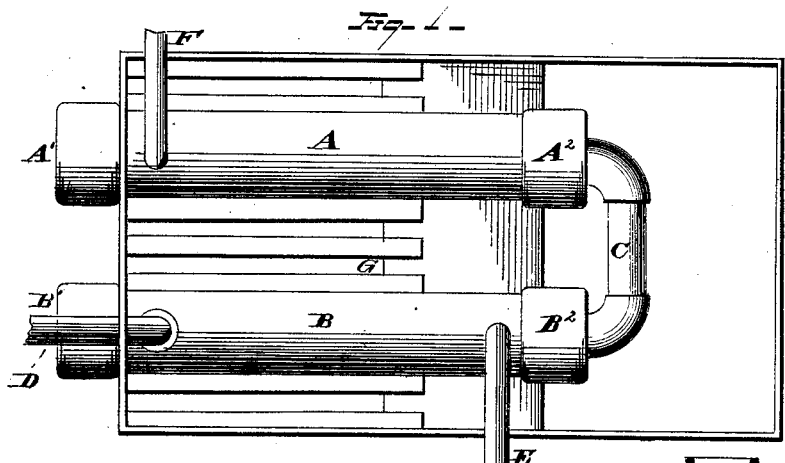
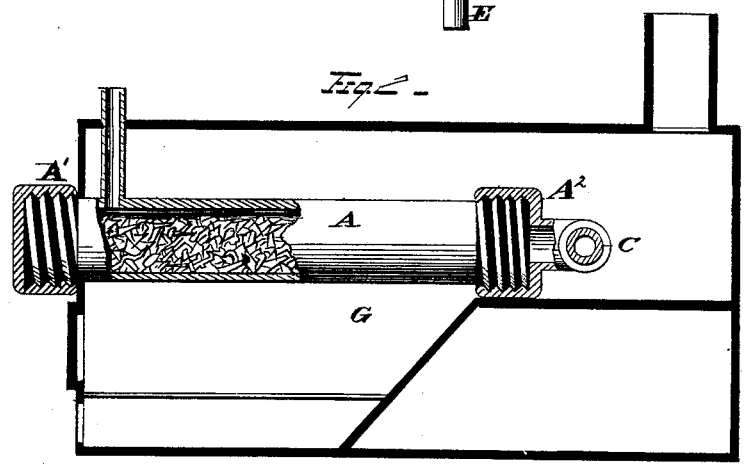
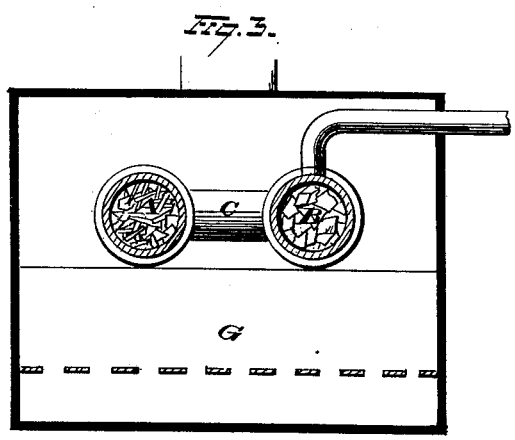

UNITED STATES PATENT OFFICE.

THOMAS TULLY, OF SPRINGFIELD, ILLINOIS.

IMPROVEMENT IN APPARATUS FOR THE MANUFACTURE OF ILLUMINATING-GAS.

Specification forming part of Letters Patent No. 197,001, dated November 13, 1877; application filed August 9, 1877.

*To all whom it may concern:*

Be it known that I, THOMAS TULLY, of Springfield, in the county of Sangamon and State of Illinois, have invented certain new and useful Improvements in Apparatus for the Manufacture of Illuminating-Gas; and I do hereby declare the following to be a full, clear, and exact description of the invention, such as will enable others skilled in the art to which it pertains to make and use it, reference being had to the accompanying drawings, which form part of this specification.

In the drawings, Figure 1 is a plan view, Fig. 2 a longitudinal central section, and Fig. 3 a cross-section, of an apparatus embodying my invention.

A is a retort, which it is designed to charge with scrap-iron as a readily-oxidizable substance. B is another retort, designed to be charged with fire-brick as a refractory substance. C is a pipe connecting the two. This pipe may pass directly between the two, or its course may be indirect, it being intended that the hydrogen set free in the retort A may pass quickly and freely to the retort B. D is an outlet-pipe for the gas. $A^1$ $B^1$ are screw-plugs, respectively closing the charging ends of the retorts A and B, while their opposite ends are also closed by similar screw-plugs $A^2$ $B^2$, with which latter the rear connecting-pipe C engages. E is a pipe through which hydrocarbon oil or other liquid may be fed; F, a pipe through which water or steam (free or superheated) may be passed to the retort A. Retorts A B are located, in the same horizontal plane, within a suitable furnace, G.

The operation of my device is as follows: The retort A is charged with scrap-iron. The retort B is charged with broken fire-brick. The retorts are then heated to a high degree, and water, in its natural form or in the form of steam, is then passed into the retort A through the pipe F. At the same time the oil—as, for instance, petroleum—is passed through the pipe E into the retort B. The iron, when heated, takes the oxygen from the vapor of water, and the remaining hydrogen passes around into the retort B and unites with the vapor of the oil. The two are then highly heated in passing over and through in contact with the large heating-surfaces exposed by the fire-brick, and is converted into a permanent gas, ready for burning. It will be understood that, before passing to the burner, I may or may not pass through a suitable condensing and filtering apparatus in order to purify it, though it will burn with good effect without such purification or condensation.

What I claim is—

The described apparatus for the manufacture of illuminating-gas from hydrocarbon oil and water, consisting of the independent retorts A and B, connected by screw-plugs $A^2$ $B^2$ and pipe C, the same being respectively charged with scrap-iron and fire-brick, and supported in the same horizontal plane within the furnace G, said retort A being provided with steam-pipe F, and retort B being provided with oil-inlet pipe E and gas-outlet pipe D, substantially as described.

In testimony whereof I have signed my name to this specification in the presence of two subscribing witnesses.

THOMAS TULLY.

Witnesses:
W. H. DOAN,
E. W. COOPER.